US006024681A

United States Patent [19]

Latten et al.

[11] Patent Number: 6,024,681

[45] Date of Patent: Feb. 15, 2000

[54] TOOL CHANGING MECHANISM FOR A METAL FORMING PRESS

[75] Inventors: Werner Latten, Oerlinghausen; Hideji Saito, Duesseldorf, both of Germany

[73] Assignee: Amada GmbH, Haan, Germany

[21] Appl. No.: 08/948,972

[22] Filed: Oct. 10, 1997

[30] Foreign Application Priority Data

Oct. 18, 1996 [DE] Germany ........................... 196 43 163

[51] Int. Cl.[7] ............................ B21J 13/08; B23Q 3/155

[52] U.S. Cl. ................................ 483/29; 72/446; 483/68

[58] Field of Search .......................... 72/446, 448, 389.3; 483/28, 29, 68

[56] References Cited

U.S. PATENT DOCUMENTS

| | | | |
|---|---|---|---|
| 4,624,044 | 11/1986 | Bredow et al. | 483/28 |
| 4,680,955 | 7/1987 | Sakamoto | 483/29 |
| 4,916,951 | 4/1990 | Messner | 72/448 |
| 4,985,983 | 1/1991 | Otto et al. | 483/29 |
| 5,070,593 | 12/1991 | Sahashi et al. | 483/29 |
| 5,168,745 | 12/1992 | Miyagawa et al. | 72/446 |
| 5,215,513 | 6/1993 | Maynard et al. | 72/446 |
| 5,320,595 | 6/1994 | Hirata et al. | 483/29 |
| 5,346,454 | 9/1994 | Hayashi | 493/29 |
| 5,350,347 | 9/1994 | Fujiwara et al. | 483/28 |
| 5,366,431 | 11/1994 | Smith et al. | 72/446 |
| 5,827,159 | 10/1998 | Adachi | 483/29 |

FOREIGN PATENT DOCUMENTS

| | | | |
|---|---|---|---|
| 0 392 795 A2 | 10/1990 | European Pat. Off. . | |
| 0 472 200 A2 | 2/1992 | European Pat. Off. . | |
| 25 09 310 A1 | 9/1976 | Germany . | |
| 43 02 119 A1 | 7/1994 | Germany . | |
| 4330674 A1 | 3/1995 | Germany . | |
| 2-251322 | 10/1990 | Japan | 483/29 |

*Primary Examiner*—Daniel W. Howell
*Attorney, Agent, or Firm*—Laubscher & Laubscher

[57] ABSTRACT

The present invention refers to a tool-changing mechanism that can be used especially in combination with a metal-forming press. Especially in the case of big and heavy forming tools, pairs of tools are difficult to exchange. The present invention intends to provide the possibility of exchanging also tools of this type rapidly and easily, the tool exchange being, in addition, carried out automatically, if desired. For this purpose, the tool-changing mechanism (1) includes a circulating means provided with a plurality of reception means (4*a*, 4*b*) for holding forming tools (5*a*, 5*b*). The tool-changing mechanism is adapted to be set up beside a metal-forming press. At a tool changing position, the tools can be pushed into the metal-forming press. Furthermore, the present invention refers to an arrangement comprising a metal-forming press and a tool-changing mechanism in the case of which said tool-changing mechanism is arranged directly at the side of the metal-forming press (10).

8 Claims, 9 Drawing Sheets

TOOL CHANGING MECHANISM FOR A METAL FORMING PRESS

BACKGROUND OF THE INVENTION

1. Field of the Invention

The present invention refers to a tool-changing mechanism for a metal-forming press, e.g. a bending or an edging press, and an arrangement comprising a metal-forming press and a tool-changing mechanism.

2. Brief Description of the Prior Art

Metal-forming presses are normally provided with exchangeable tool sets. Each tool set comprises at least one upper tool or punch and one lower tool or die. For producing a workpiece or for carrying out a specific bending step at a workpiece, the punch and the die must be adapted to one another. When a new workpiece is to be produced, the punch and the die are both exchanged simultaneously. The associated tools, i.e. punches and dies, have been stored in pairs in a rack away from the press up to now. When the tools are to be exchanged, an operator takes them out of the rack and positions them at a tool changing position in front of the press. Especially in the case of big and heavy tools, the transport to the press as well as the positioning of the tools in the press is difficult. In edging presses, for example, where the punches and dies have lengths of up to 800 mm, said tools must separately be moved to their insertion position, aligned parallel to the respective holder of the press and inserted into said press.

3. Summary of the Invention

In comparison with this prior art, it is the object of the present invention to provide a tool changing mechanism and an arrangement comprising a metal-forming press and a tool-changing mechanism permitting a simple and rapid exchange of tools.

This object is achieved by a tool changing mechanism for a metal-forming press, which comprises a circulating means provided with a plurality of reception means for holding forming tools and which is adapted to be set up beside the metal-forming press, wherein, at a tool changing position, tools are adapted to be transferred from said tool changing mechanism to said metal-forming press or from said metal-forming press to said tool changing mechanism. In this way, a plurality of tool sets each comprising a punching tool, e.g. a punch, and an associated countertool, e.g. a die, can be stored in a common device and they can be supplied rapidly and easily from said device to a press, e.g. an edging press. A complicated positioning of the heavy tools relative to a press by hand is no longer necessary. The tools can be inserted into the metal-forming press and into the tool changing mechanism, respectively, (straight-line tool changing movement).

According to an advantageous further development of the present invention, the tool changing mechanism comprises a movable, endless traction-means drive, which is provided on a frame, and reception means for receiving punching tools as well as reception means for receiving countertools associated with the respective punching tools, said reception means being attached to the traction-means drive. Said reception means are arranged such that a respective punching-tool reception means and a respective countertool reception means, which are used for receiving a punching tool and the associted countertool, follow one another on the traction-means drive. Due to the fact that the reception means for the associated tools are arranged in immediate succession, punching tools and countertools can be exchanged simultaneously or in quick succession, without any renewed complicated fetching being necessary for transporting the second tool to the tool changing position. The successive arrangement on the traction means drive additionally permits the tool changing mechanism to be constructed such that, when arranged at the side of a press, said tool changing mechanism will be flush with the front side of said press so that the operating space at the side and in front of the press will not be restricted. This is particularly advantageous with regard to presses in which very large sheet-metal parts are processed.

According to an advantageous further development of the present invention, the punching-tool reception means and the countertool reception means of each pair of reception means are attached to the traction-means drive in equally spaced relationship with one another. The space is chosen with regard to the position of the tool holders in a press at its position of rest. Hence, the sequence of tool changing steps is reproducable for each pair of reception means and the tools attached to said reception means.

The reception means are preferably pivotably coupled to the traction-means drive. Especially when the traction means drive is arranged vertically—this mode of arrangement being expedient for space-saving reasons—this will prevent the formation of strong bending forces in the reception means when said reception means are moved along the deflection route of the traction means drive.

In accordance with a further advantageous embodiment of the present invention, a position detection device is arranged on the frame for detecting the position of a reception means relative to a predeterminable tool-changing position. This ensures that the traction means drive, which can be driven manually or by a motor, can be stopped precisely at the correct point of the tool changing position. The tool changing operation can, in addition, be automated in this way; for this purpose a suitable control means can be provided, said control means being used for controlling motion devices, e.g. slide members, for loading and unloading the reception means, said motion devices being provided e.g on the frame or on the individual reception means themselves.

According to a further advantageous embodiment of the present invention, at least one storage facility is attached to the traction-means drive for holding punching tools and/or countertools, the tools being adapted to be inserted into and removed from said storage facility in the longitudinal as well as in the transverse direction thereof. These storage facilities are particularly suitable for accommodating a plurality of small or short tools. If necessary, these tools can be removed from the storage facility by hand, and combined so as to form a set of tools which is then pushed into a punching-tool reception means or countertool reception means. The storage facilities can be arranged on the traction means drive at arbitrary distances from one another as long as the associated reception means pairs are not impaired by this arrangement.

The object referred to at the beginning is also achieved by an arrangement comprising a metal-forming press and a tool-changing mechanism, wherein the tool-changing mechanism is set up directly beside the metal-forming press. At the tool changing position, the tools can, consequently, be pushed directly and without further positioning measures out of the tool changing mechanism and into the press. This can be done manually as well as automatically. Preferably, the press is provided with a holder for punching tools and a holder for countertools, said holders being, at a position of rest of the press, located at a distance from one another which corresponds to the distance between a punching-tool reception means and the associated countertool reception means at a tool-changing position, the respective holders and reception means being in alignment with one another. The punches and the dies can efficiently be exchanged in this way.

For the use of already existing tools with the tool changing mechanism according to the present invention, adapters can be attached to holders, said adapters having, in turn, attached thereto these tools such that said tools are slidable in the longitudinal direction of the respective holder. This permits also the use of two-part tools consisting of an upper and a lower part. For this purpose, the tool changing mechanism and the traction means drive, respectively, have a second tool-changing position, which is displaced relative to a first tool-changing position by a displacement length. Said displacement length corresponds to the thickness or rather the height of the lower part so that at said second tool changing position only the tool in question can be transported into the associated holder of the press.

In accordance with a preferred embodiment, a tool-changing mechanism is arranged on either side of the press. This ensures that, simultaneously with the insertion of a new tool into the press, the tool contained in the press can be transported into the opposite tool changing mechanism, whereby the efficiency of the tool changing operation will be increased still further.

In the case of particularly long presses, it is also possible to arrange several juxtaposed tool-changing mechanisms in an in-line arrangement so that the reception means of the individual tool-changing mechanisms are in alignment with one another at the tool-changing position.

BRIEF DESCRIPTION OF THE DRAWINGS

Making reference to the drawings, the present invention will now be explained in detail on the basis of embodiments; in said drawings.

The tool-changing mechanism 1 comprises a frame 2 in which a movable, endless traction drive means 3 is provided. Said traction drive means has attached thereto reception means 4*a*, 4*b* for receiving punches 5*a* and dies 5*b* associated with said punches. In the embodiment shown, the traction drive means 3 is implemented as a chain drive whose traction means or chain 3*a* extends essentially in the vertical direction. The circulating traction means 3*a* is deflected by two deflection pulleys 3*b*, 3*c* which are arranged one above the other. The traction-means drive 3 can be moved, preferably in both directions, either manually or by an e.g. electric drive means.

Figure 2:
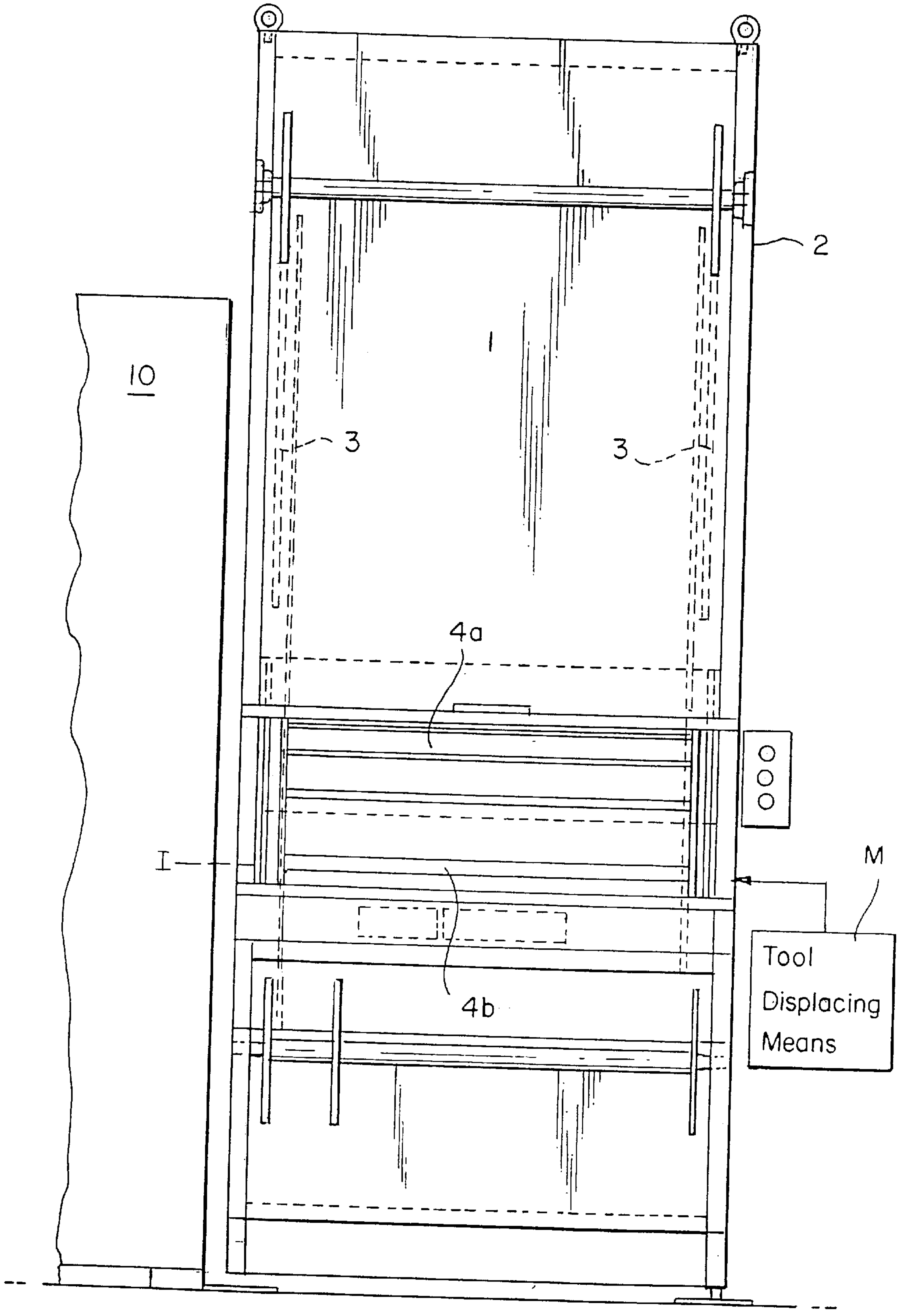
FIG. 2 shows a front view of the tool changing mechanism according to FIG. 1.
Figure 3:
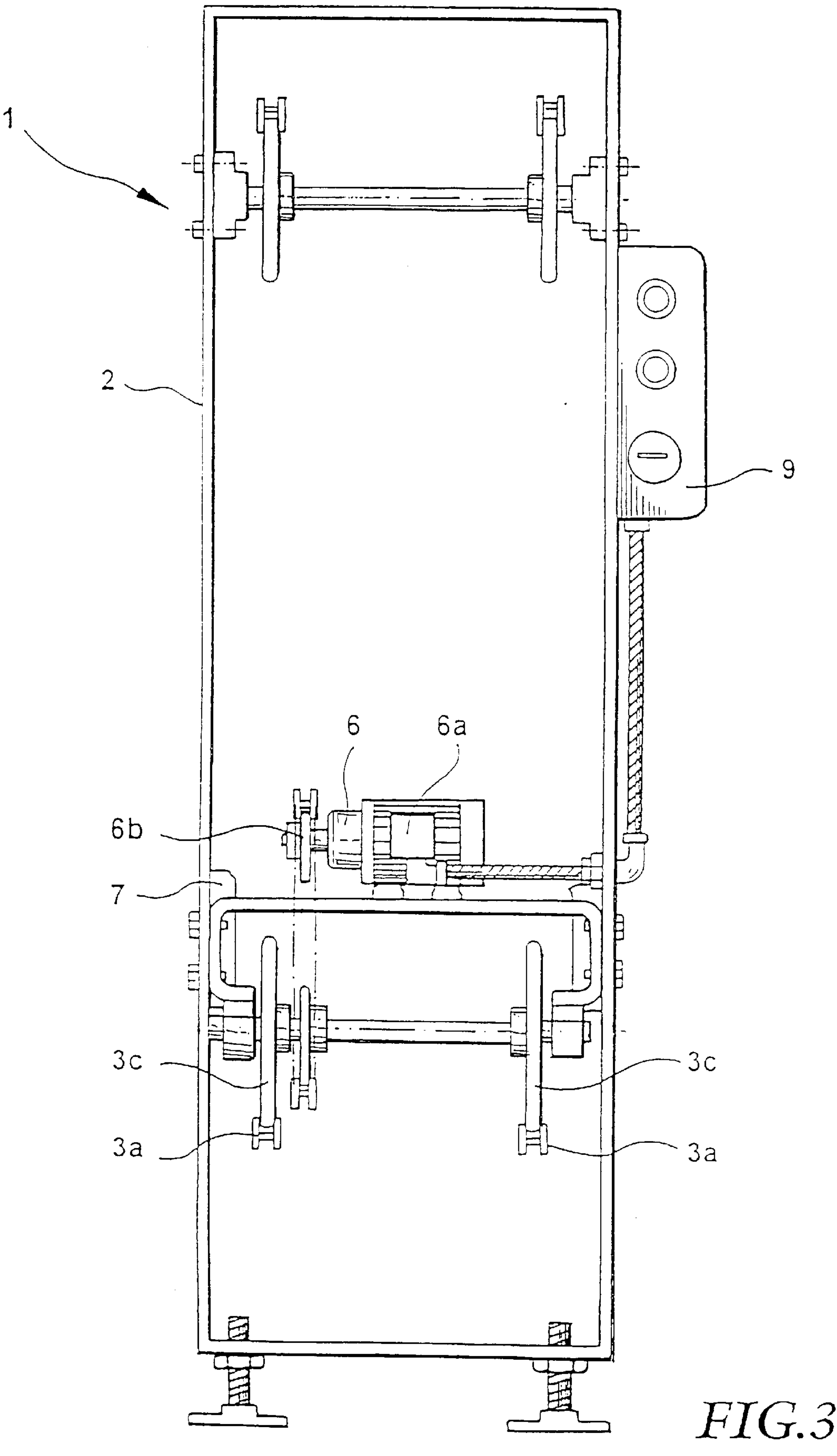
FIG. 3 shows a representation of the drive means of the tool changing mechanism according to FIG. 1.

The traction drive means 3 has attached thereto a plurality of reception means 4*a*, 4*b*. In the embodiment shown, said reception means serve to hold punches and complementary dies for an edging press 10 (FIG. 2) which is here not shown in detail. It follows that the main direction of extension of the reception means is essentially horizontal and transverse to the direction of movement of the traction drive means. For supporting the reception means which have a suitable length, said reception means are coupled to a respective traction-means drive 3 at both ends thereof, as can be seen in FIG. 2. When the reception means are very long, additional traction drive means 3 can be provided between the two outer traction drive means.

The reception means 4*a*, 4*b* are implemented either as punch reception means 4*a* or as die reception means 4*b*, and they are alternately coupled to the traction drive means 3 so that a punch reception means 4*a* and a die reception means 4*b* are arranged in immediate succession. During operation, such a pair of reception means is equipped with associated punches and dies so as to permit a rapid exchange of the tools in a press 10.

In each pair of reception means, the punch reception means 4*a* and the die reception means 4*b* are arranged on the traction drive means 3 at the same distance b from each other. This has the effect that, at a tool-changing position I, the distance a between the punch 5*a* held in the punch reception means 4*a* and the associated die 5*b* held in the complementary die reception means 4*b* will always be the same. This distance a between the tools corresponds to the distance between corresponding holders 11*a*, 11*b* (FIG. 6) on the press 10 at its position of rest used for loading.

In the following, the respective reception means 4*a*, 4*b*, which are arranged on the outer side of the traction drive means 3 such that they extend parallel to one another, will be described in detail on the basis of FIGS. 4 and 5, the former showing a punch reception means 4*a* and the latter a die reception means 4*b*.

Figure 1:
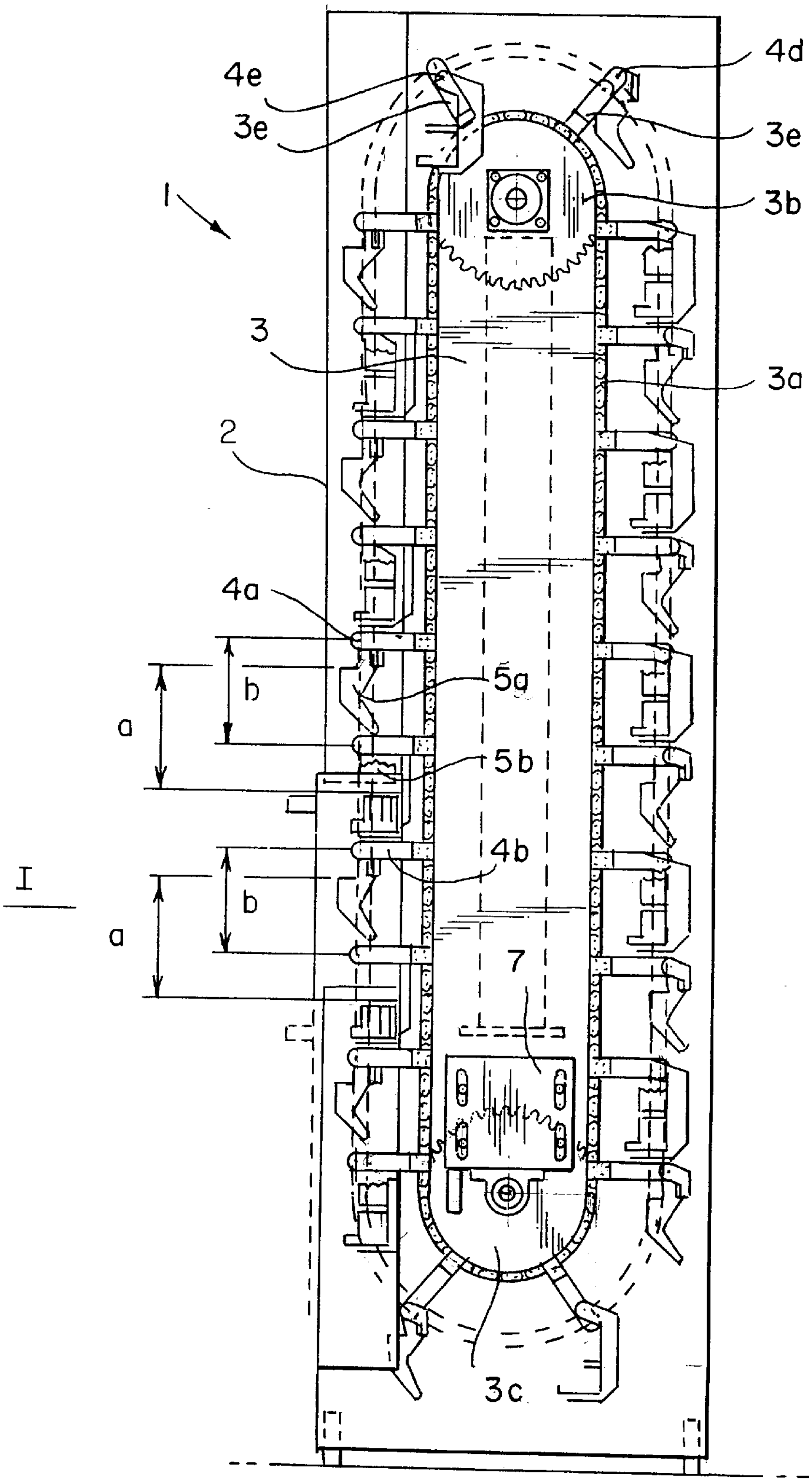
FIG. 1 shows a side view of a tool changing mechanism for an edging press.

Both types of reception means are pivotably suspended from supporting bars 3*e* projecting radially outwards from the chain or the traction means 3*a*. The reception means are articulated on the respective supporting bar 3*e* in a radially outer end section of said supporting bar 3*e*. This articulation has the effect that, especially during the deflection of the reception means, the distance between the heavy dies and the deflection centre is kept small so that, in contrast to rigid coupling, the forces occurring and, consequently, the loads acting on the traction drive means 3 and on a drive means can be kept small. As can especially be seen from FIG. 1, the point at which the die reception means 4*b* are articulated on the supporting bars 3*e* is loacted further inwards than the point of articulation of the punch reception means 4*a*.

Figure 4:
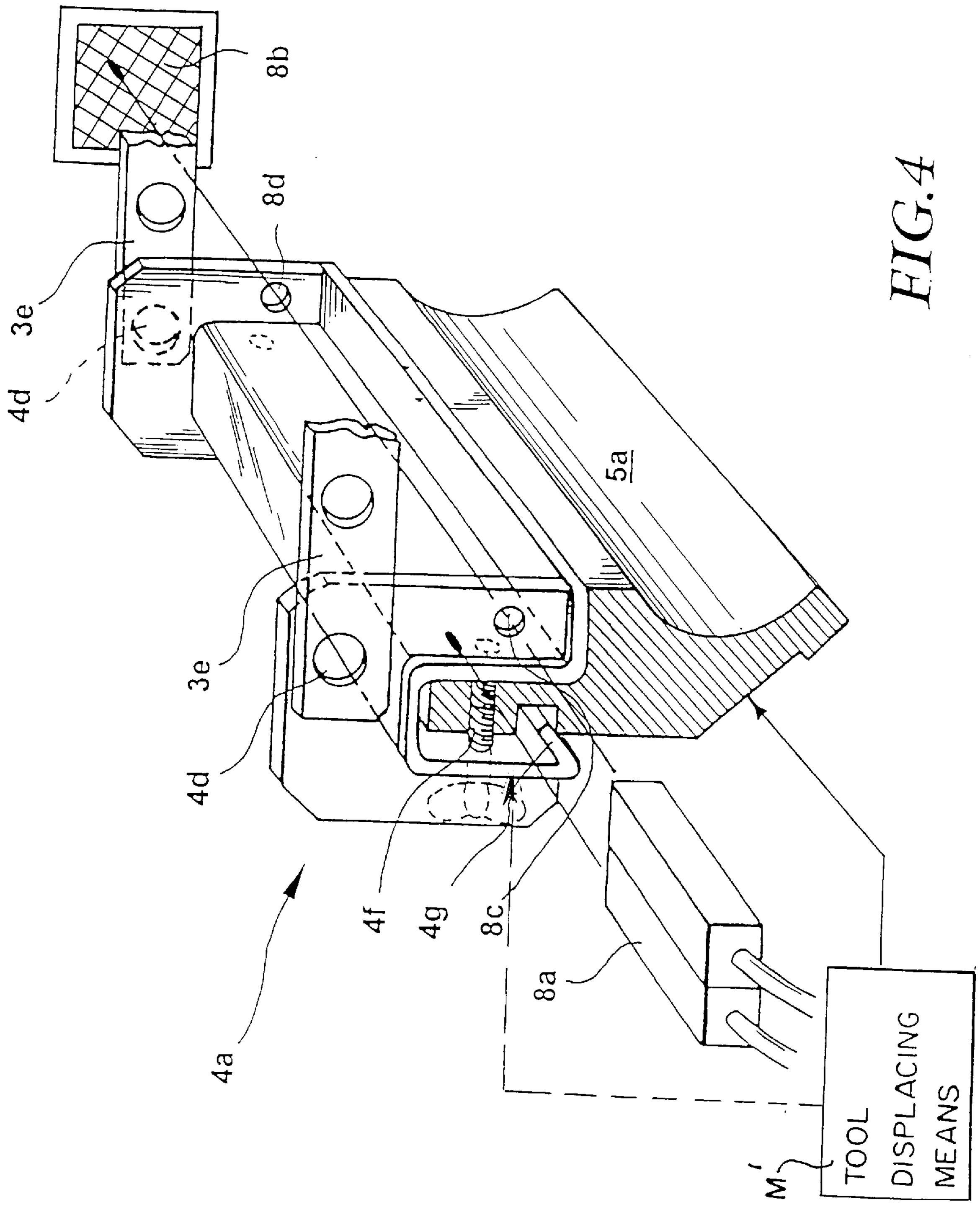
FIG. 4 shows a reception means for a punch as well as a position detection device.

As can be seen in FIG. 4, the punch reception means 4*a* have a guide groove 4*g* from which the punches 5*a* can be suspended. The guide groove 4*g* extends in the longitudinal direction of the reception means and permits the punches 5*a* to be drawn out towards the side in the direction of a press 10 to be equipped. On the opposite side, the groove is delimited by a stop 4*f* so as to prevent an inadvertent removal of the tools in this direction. The stop 4*f* is implemented as a releasable stop so as to permit the reception means 4*a* to be equipped from this side, if necessary.

Figure 5:
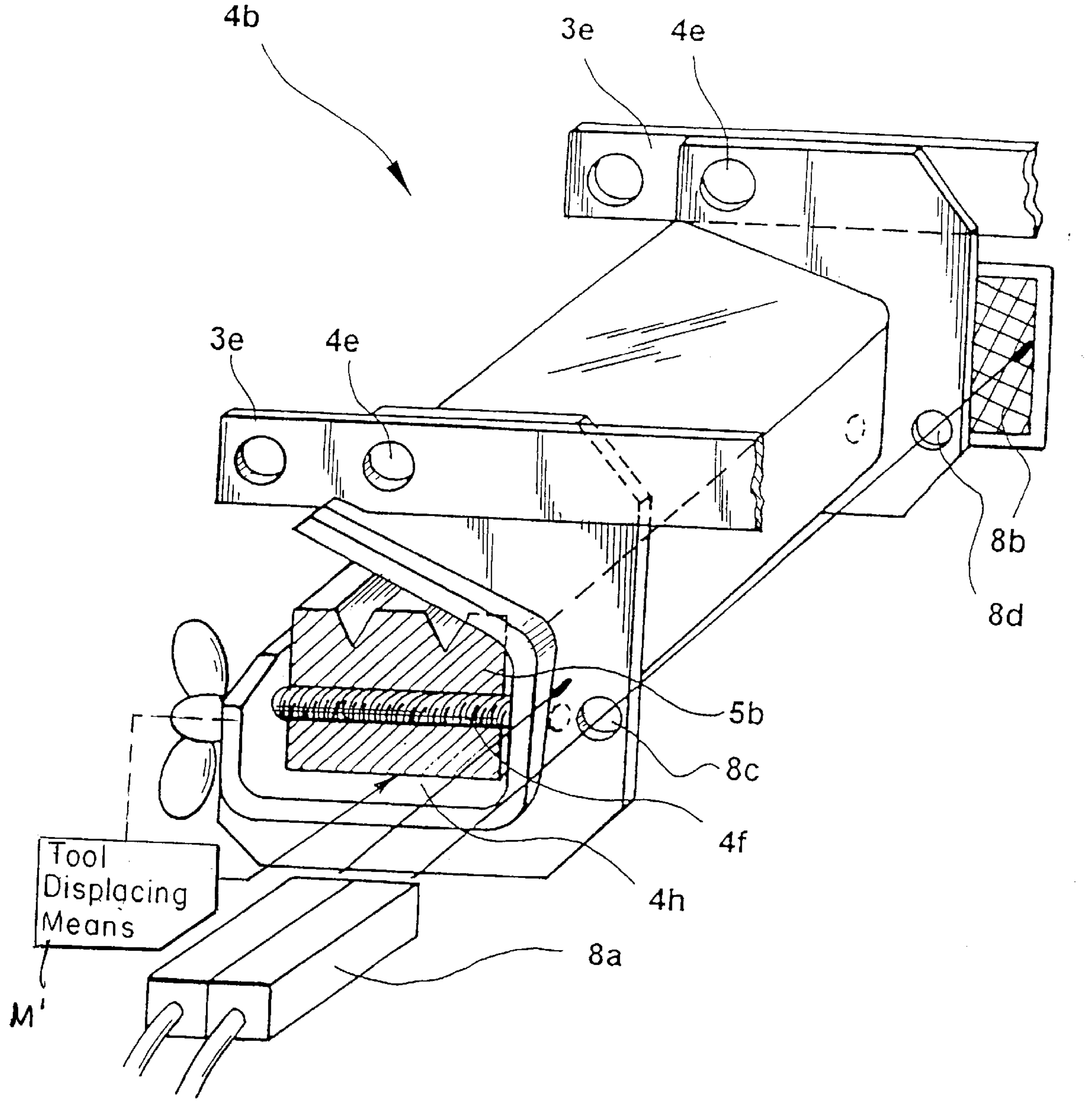
FIG. 5 shows a reception means for a die and a position detection device.

FIG. 5 shows a die reception means 4*b* provided with a longitudinally extending guide groove 4*h* in which the dies can be supported in vertical position. The dies 5*b* can be removed from the die reception means 4*b* in the same direction as the punches 5*a*, said die reception means 4*b* being, like the punch reception means 4*a*, also provided with a releasable stop 4*f*.

Both reception means 4*a*, 4*b* are implemented as bent profiled components having welded thereto flanges used for pivotally connecting said reception means to the supporting bars 3*e*. Thus the reception means shown can be produced easily and at a moderate price.

In order to find out whether a pair of reception means 4*a*, 4*b* has reached a predetermined tool-changing position I, a position detection device is provided on the frame 2; in the case of the embodiment shown, said position detection device acts as a light barrier and comprises appropriate light sources 8*a* (FIGS. 4 and 5) and associated sensors 8*b*. The light barrier shown cooperates with positioning openings 8*c*, 8*d* on the reception means 4*a*, 4*b*. These openings 8*c*, 8*d* are preferably provided on the flanges of the reception means, said flanges extending transversely to the longitudinal direction of the reception means and of the light barrier.

The position detection device 8*a*, 8*b* cooperates with a control device controlling a drive means 6 for driving the traction drive means 3.

In the embodiment shown, the drive means 6 is implemented as a stop motor 6*a* followed by a transmission stage 6*b*. The transmission 6*b* drives a shaft 3*d* interconnecting the lower deflection pulleys 3*c* of the traction drive means 3. The shaft 3*d* as well as the lower deflection pulleys 3*c* are supported on an adjustment device 7 which is adapted to be displaced relative to the frame 2, here in the vertical direction, and to be secured in position. On the one hand, this permits an adjustment of the tension of the chain and of the traction means 3*a*, respectively; on the other hand, it permits a removal of the traction means 3*a*.

Figure 6:
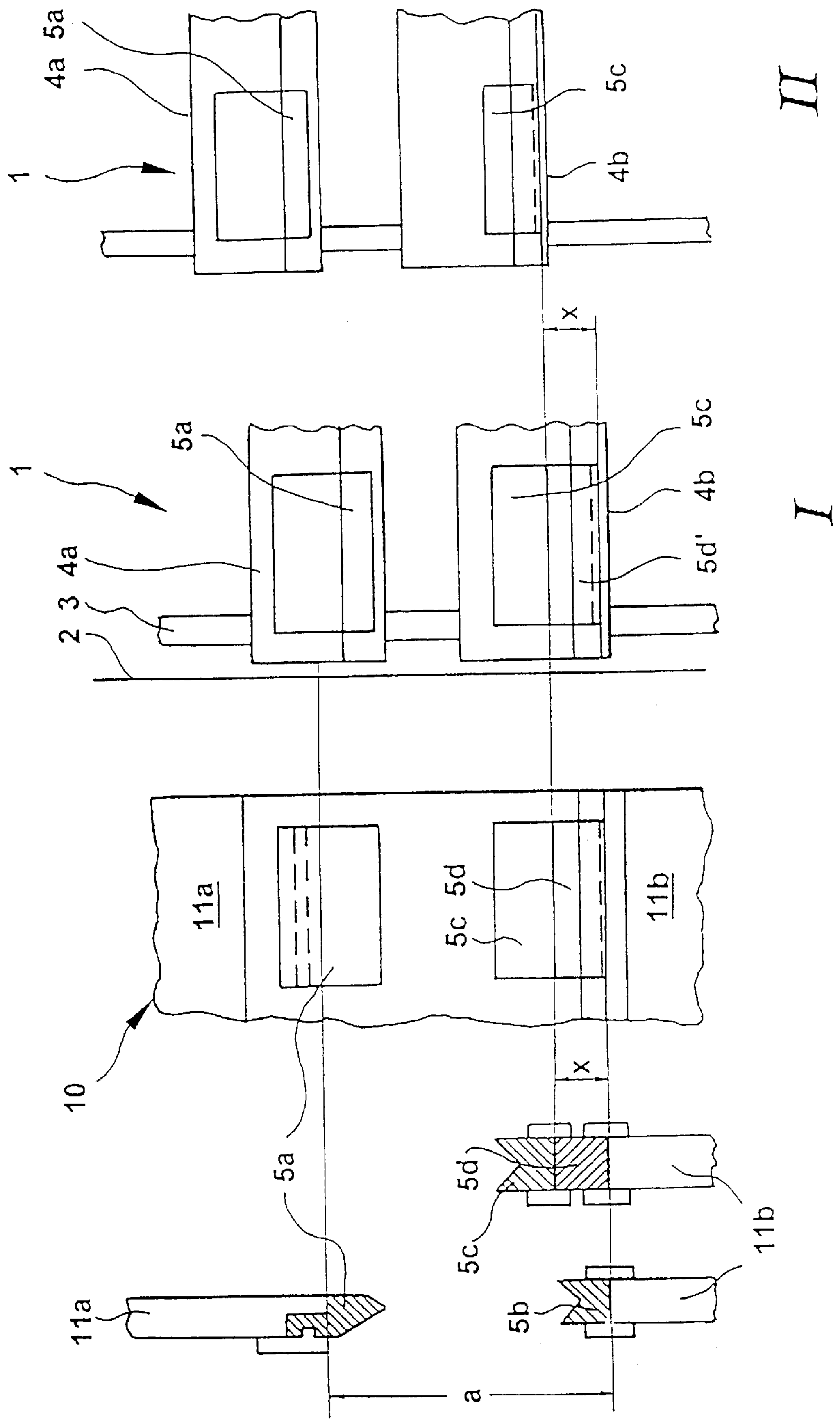
FIG. 6 shows the position of a punch holder and of a die holder at the tool changing position relative to the holders of the press as well as the position of a second tool changing position.

For moving the tools along the guide means 4*g*, 4*f* in the reception means 4*a*, 4*b*, motion devices are provided, which can be implemented e.g. as cylinder-actuated slide members and which, if necessary, are also provided with clutches by means of which they can be coupled to the tools so as to withdraw said tools from the holders 11*a*, 11*b* of a press. The motion devices can either be arranged in a stationary manner on the frame 2 at the predetermined tool-changing positions (FIG. 2) or they can be provided on the reception means themselves (FIGS. 5 and 6). If the punches 5*a* and the dies 5*b* are to be exchanged simultaneously, it is also possible to provide only a single motion device for both tools 5*a*, 5*b* in the first-mentioned case.

Figure 7:
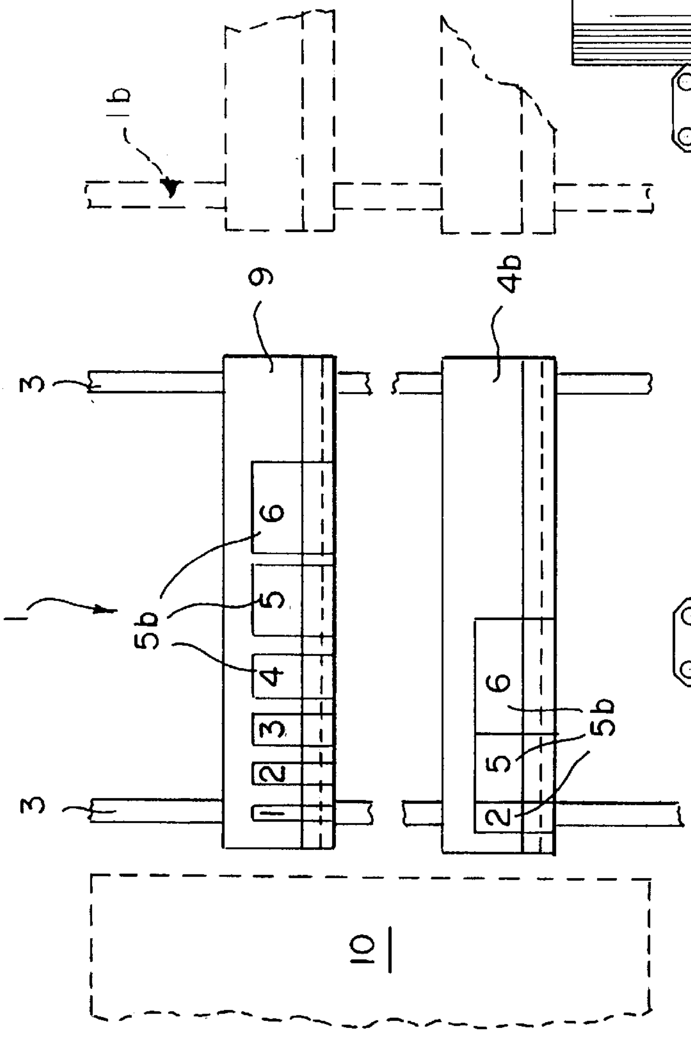
FIG. 7 shows a storage facility and a reception means of the tool changing mechanism.

In addition to the reception means 4*a*, 4*b*, which have already been described, further reception means can be provided on the traction-means drive, said further reception means being implemented as storage facilities, as can be seen in FIG. 7. These storage facilities are particulary suitable for keeping in store a plurality of tools having a smaller size, e.g. short dies or punches. Depending on their structural design, the storage facilities 9 can accommodate either punches or dies or, provided that they have a suitable structural design, also both types. Said storage facilities 9 are preferably designed in such a way that the tools contained therein can, on the one hand, be displaced towards the side and removed and, on the other hand, be removed from the front, i.e. in the transverse direction. Tools having different profiles can therefore easily be removed from the storage facility 9 out of turn so that a reception means 4*a*, 4*b* can then be equipped with these tools by hand.

In some cases, two-part dies are used in bending presses, said dies being composed of an upper part 5*c* (FIGS. 5 and 6) and a lower part 5*d*. If it is only the upper part 5*c* that is to be changed in such a case, whereas the lower part 5*d* remains in the bending press, an adapter 5*d'* is inserted into the respective reception means 4*b* of the tool changing mechanism 1, the height x of the adapter corresponding to that of the lower part 5*d*. All the tools of the press 10 can be exchanged simultaneously at the tool changing position I. For this purpose, the motion device can be dimensioned such that the dies are always acted upon in an area corresponding to the position of the upper die 5*c*.

Alternatively, the upper die 5*c* can also be deposited in a reception means directly, i.e. without any adapter. For exchanging the upper part, the respective reception means 4*b* is moved to a second tool changing position II at which the upper part 5*c* can be pushed onto the associated lower part 5*d* in the press. In the embodiment shown, the reception means is moved to the first tool changing position I for exchanging the punch 5*a*. The first tool changing position is displaced relative to the second one by the thickness or rather the height x of the lower part 5*d*.

As has already been mentioned hereinbefore, the press 10 is provided with a holder 11*a* for punches 5*a* and a holder 11*b* for dies 5*b*, said holders being, at a position of rest in the press, located such that the distance a between their guide paths corresponds to the distance between the guide paths of a punch reception means 4*a* and of the associated die reception means 4*b* at the tool changing position I. The tool changing mechanism 1 is arranged at the side of the press 10 so that the respective holders 11*a*, 11*b* of the press 10 and the reception means 4*a*, 4*b* of the tool changing mechanism 1 are aligned in such a way that the tools can easily be pushed from the tool changing mechanism 1, 1*a* (FIG. 12) into the press 10. Preferably, a tool changing mechanism 1 is arranged at both sides of the press 10, said tool changing mechanisms 1 being controlled by a common control unit. When the tools are being exchanged, the tools contained in the bending press can then be pushed out of the press and into the second tool changing mechanism by means of the tools inserted from the side of the first tool changing mechanism.

Figure 12:
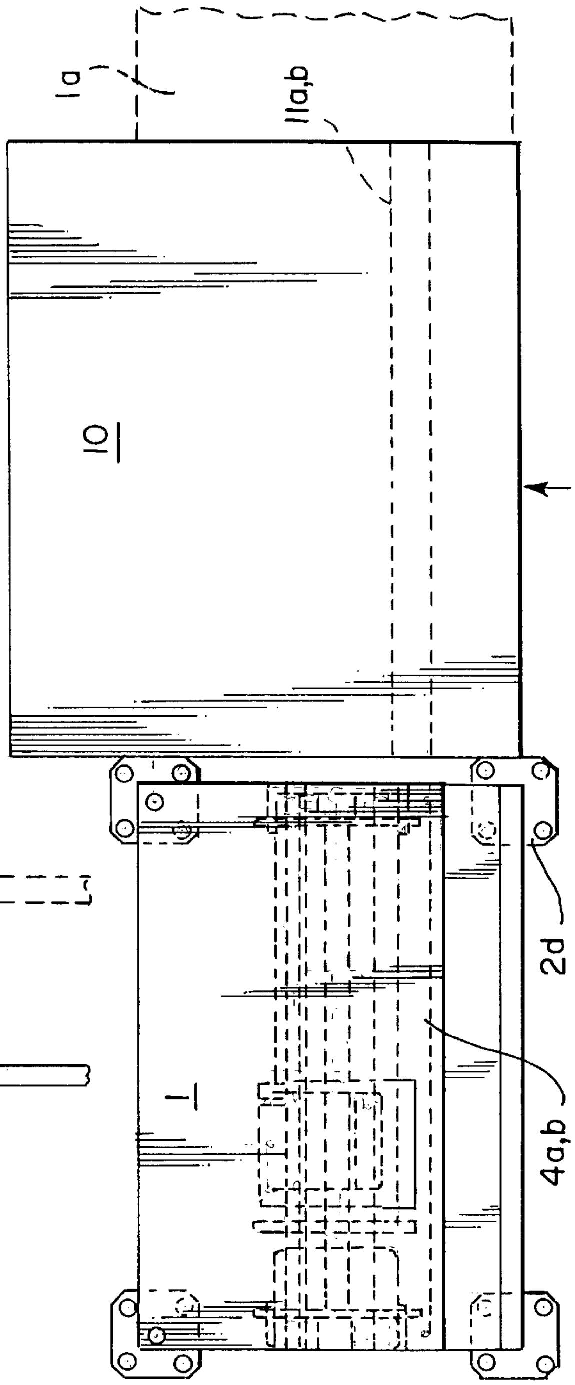
FIG. 12 shows a top view of an arrangement comprising a metal-forming press and a tool-changing mechanism.
Figure 9:
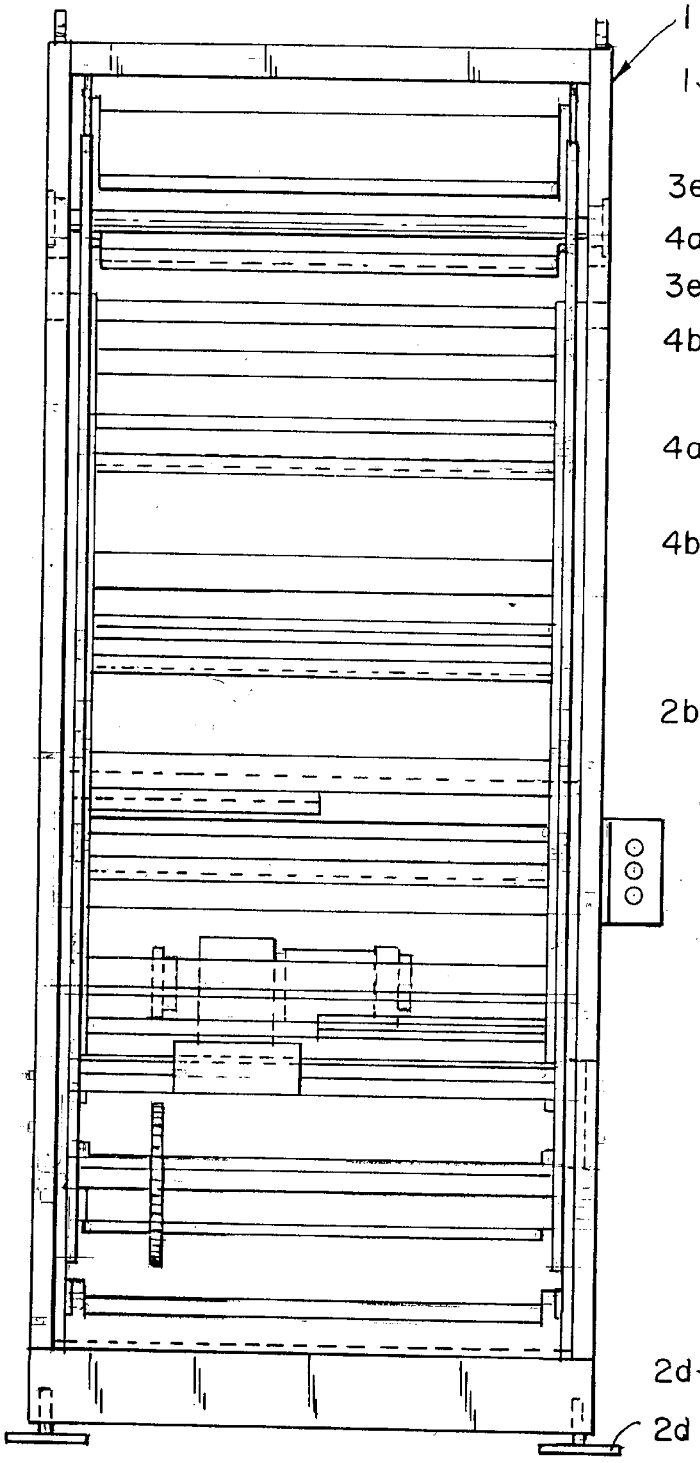
FIG. 9 shows a front view of the tool changing mechanism according to FIG. 8.
Figure 8:
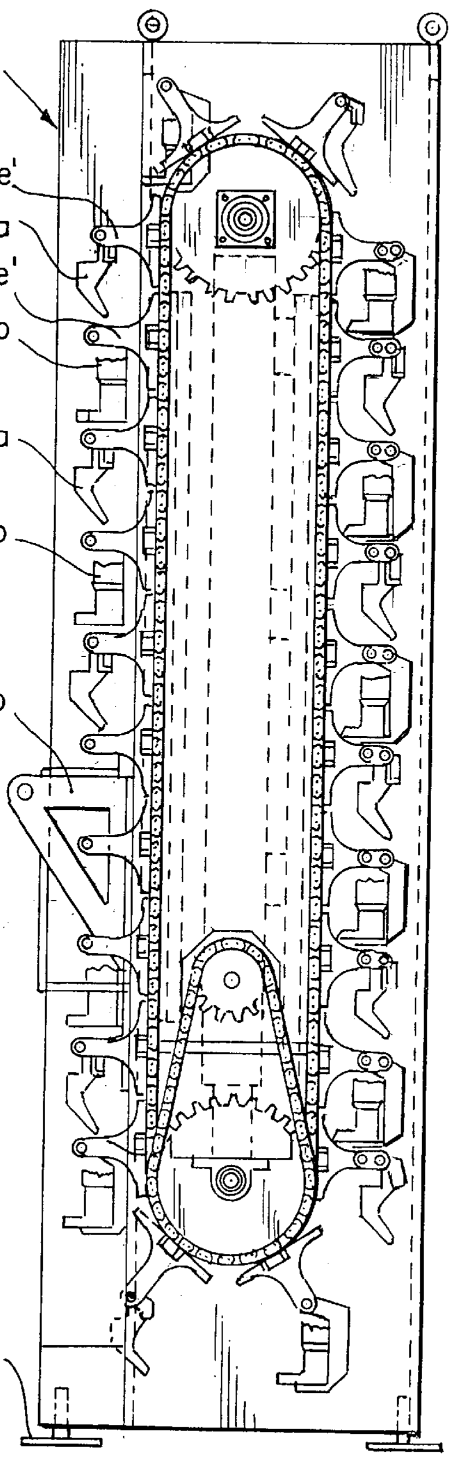
FIG. 8 shows a side view of a second embodiment with a modified traction means drive, in an uncovered condition of the machine.
Figure 11:
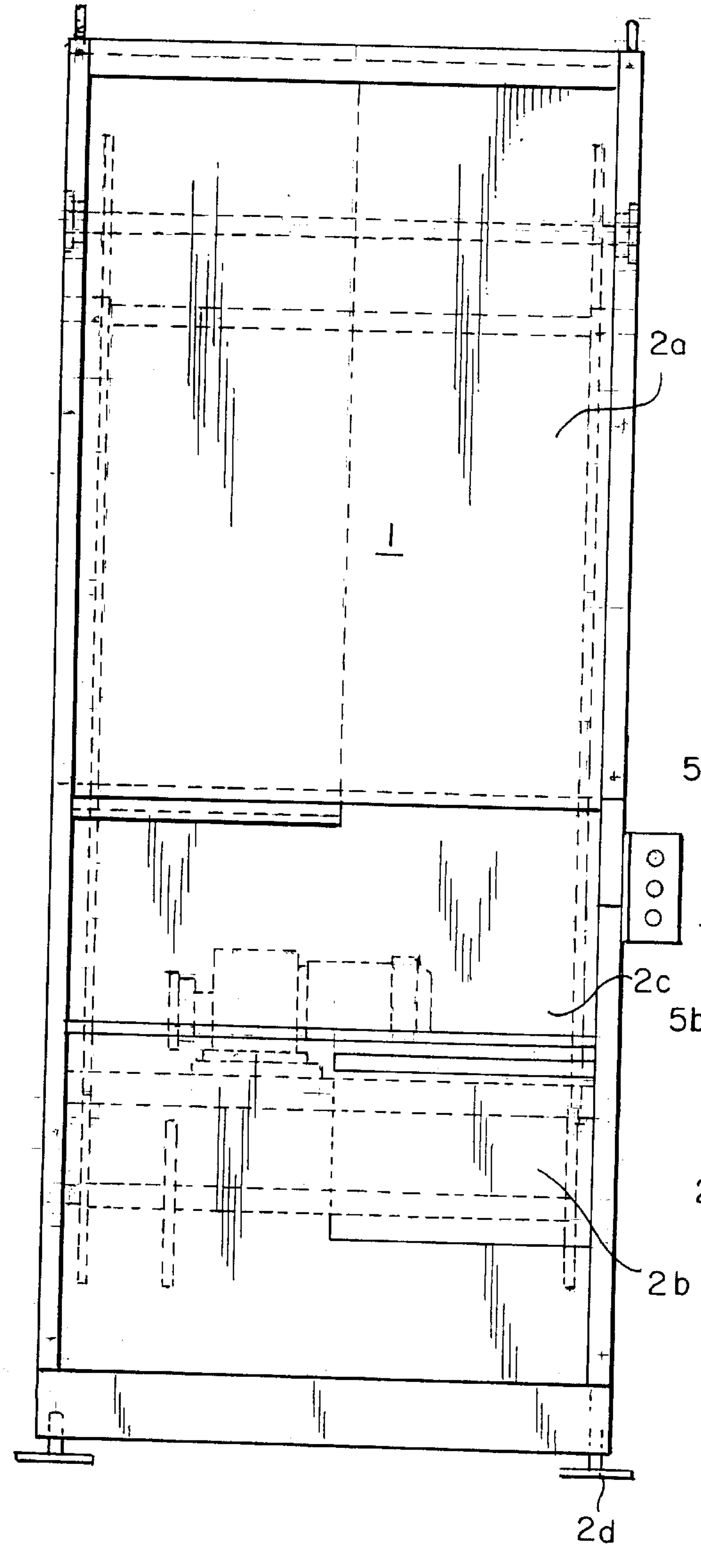
FIG. 11 shows a front view of the machine shown in FIG. 10.
Figure 10:
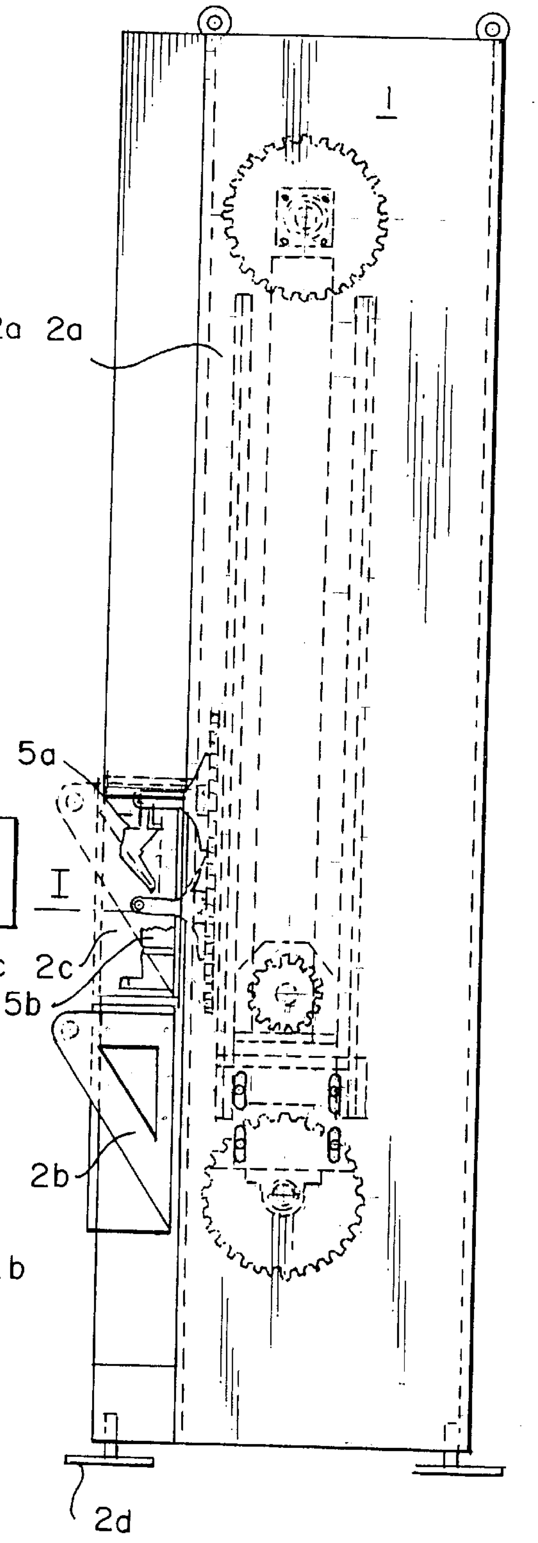
FIG. 10 shows a side view according to FIG. 8 in the covered condition of the machine.

The width of the tool changing mechanism, i.e. essentially the length of the reception means, can be shorter than the bending length of the press 10 so as to permit a compact structural design of the tool changing mechanism. The divided tools are then deposited in successive pairs of reception means in the tool changing mechanism and, if required, they are successively loaded into the bending press 10. For reducing the floor area, the frame 2 is constructed such that it extends essentially in the vertical direction in the case of the embodiment shown. The tool changing mechanism could, however, just as well be arranged horizontally. The successive arrangement of the reception means on the outer side of the traction means drive permits the tool changing mechanism to be arranged such that it is flush with an adjacent press 10, since no further parts of the tool changing mechanism project into the operating space at the side and in front of the press. The tool changing mechanism 1 is therefore particularly suitable for use in combination with bending presses for large sheet-metal parts, which necessitate big and heavy tools. This arrangement is shown in FIG. 12, the arrow indicating the direction of insertion of workpieces into the press. In addition to primarily elongate dies, the tool changing mechanism can e.g. also be used for pairs of forging dies; for this purpose, the guide grooves of the reception means will have to be adapted in an appropriate manner.

The tool changing mechanism shown in FIGS. 8 to 11 differs from the first embodiment primarily with regard to the structural design of the supporting bars 3*e'*, which, in the case of the second embodiment, widen into an umbrellalike shape in the area where they are coupled to the traction means 3*a* and cover said traction means.

For protecting operators against injuries, the tool changing mechanism 1 is surrounded by a complete encasement 2*a*. In the area of the tool changing position, said encasement 2*a* is provided with an opening 2*c* which can be closed by means of a door or flap 2*b* and which permits tools to be pushed into the press 10. Furthermore, this opening can extend over the broadside of the tool changing mechanism 1 so as to permit access to the storage facilities 9 from the front. For reasons of safety, the traction means drive 3 is stopped as soon as the door or flap 2*b* is opened.

For positioning the tool changing mechanism 1 immediately at the side of the press 10, positioning devices 2*d* are provided on the tool changing mechanism 1. When the tool changing mechanism 1 has been positioned relative to the press 10, positioning measures are no longer necessary during the tool changing operation itself. In the case of long presses, several tool changing mechanisms 1, 1*b* (FIG.7) can be set up directly side by side and positioned relative to one another. The tool changing mechanisms are controlled such that, at a tool changing position, the reception means of all tool changing mechanisms are in alignment with the respective holders of the press so that all tools in said reception means can be pushed into the press at the same time. Also an exchange of tools between the tool changing mechanisms without exchanging the tools in the press is possible.

What is claimed is:

1. A tool changing mechanism for supplying pairs of cooperating tools to, and for receiving pairs of cooperating tools from, a forming press (10), comprising:

(a) a frame (2) adapted to be positioned adjacent the press;

(b) endless drive means (3) mounted on said frame, said drive means including a pair of parallel runs a first one of which extends adjacent a first tool changing position (I) relative to said frame;

(c) a plurality of parallel reception means (4*a*, 4*b*) connected with said drive means in equally spaced relation, said reception means extending normal to the plane containing said drive means, successive pairs of said reception means being adapted to receive the tools of said tool pairs, respectively; and (d) guide means (4*g*, 4*h*) arranged on each of said reception means normal to said endless conveyor run, said tools being supported for movement longitudinally of said guide means, whereby when a desired first pair of said reception means is positioned on said first run opposite said first tool changing position, the associated pair of tools may be transferred between said first pair of reception means and the press.

2. A tool changing mechanism as defined in claim 1, wherein each of said reception means is pivotally connected with said endless drive means.

3. A tool changing mechanism as defined in claim 1, and further including position detecting means (8*a*) arranged on said frame adjacent said first tool changing position.

4. A tool changing mechanism as defined in claim 1, wherein each of said reception means comprises a storage facility (9) for removably supporting a plurality of said tools.

5. A tool changing mechanism as defined in claim 1, and further including tool displacing means (M) mounted on said frame adjacent said first position for displacing said tools between said reception means and the press.

6. A tool changing mechanism as defined in claim 1, and further including tool displacing means (M') mounted on said reception means for displacing said tools between said reception means and the press.

7. A mechanism for changing the tools of a press (10) having a pair of relatively displaceable tool holders (11*a*, 11*b*) that are spaced a given first distance (a) when the press is at rest, comprising:

(a) a frame (2);

(b) endless traction drive means (3) mounted on said frame;

(c) a plurality of pairs of reception means (4*a*, 4*b*) arranged successively on said endless traction drive means, respectively;

(d) a cooperating pair of tools (5*a*, 5*b*) arranged in one of said pair of reception means, one of said tools consisting of a plurality of sections (5*c*, 5*d*) one of which has a given width (x); and (e) said endless traction drive means having a first run that extends adjacent a first tool changing position (I) relative to said frame, whereby when said frame is positioned adjacent the press and a desired first pair of said reception means is positioned on said first run opposite said first tool exchanging position, the tools of said tool pair are positioned opposite the tool holders of the press, respectively, for transfer of the tools between said reception means and said tool holders, respectively, said endless traction drive means being displaceable through a distance equal to said given width to a second position (II) relative to the tool holders of the press for transfer of the corresponding section of the tool.

8. A mechanism for changing the tools of a press (10) having a pair of relatively displaceable tool holders (11*a*, 11*b*) that are spaced a given first distance (a) when the press is at rest, comprising a plurality of tool-changing mechanisms arranged in alignment on the same side of said press, each of said tool changing mechanisms including:

(a) a frame (2);

(b) endless traction drive means (3) mounted on said frame;

(c) a plurality of pairs of reception means (4*a*, 4*b*) arranged successively on said endless traction drive means for removably holding the associated pairs of tools (5*a*, 5*b*), respectively; and (d) a cooperating pair of tools (5*a*, 5*b*) arranged in one of said pair of reception means, respectively;

(e) said endless traction drive means having a first run that extends adjacent a first tool changing position (I) relative to said frame, whereby when said frame is positioned adjacent the press and a desired first pair of said reception means is positioned on said first run opposite said first tool exchanging position, the tools of said tool pair are positioned opposite the tool holders of the press, respectively, for transfer of the tools between said reception means and said tool holders, respectively.

* * * * *